United States Patent [19]

Stengel et al.

[11] Patent Number: 5,204,970
[45] Date of Patent: Apr. 20, 1993

[54] COMMUNICATION SYSTEM CAPABLE OF ADJUSTING TRANSMIT POWER OF A SUBSCRIBER UNIT

[75] Inventors: Robert E. Stengel; Roger A. Davenport, both of Fort Lauderdale, Fla.

[73] Assignee: Motorola, Inc., Schaumburg, Ill.

[21] Appl. No.: 648,809

[22] Filed: Jan. 31, 1991

[51] Int. Cl.$^5$ .............................................. H04B 7/00
[52] U.S. Cl. ........................................ 455/69; 455/63; 455/126
[58] Field of Search ............ 455/10, 52, 63, 67, 455/127, 343, 69, 52.1, 52.2, 52.3, 67.1, 67.3, 226.2, 226.3

[56] References Cited

U.S. PATENT DOCUMENTS

| 4,777,653 | 10/1988 | Bonnerot et al. | 455/52 |
| 4,870,698 | 9/1989 | Katsuyama | 455/67 |
| 4,941,199 | 7/1990 | Saam | 455/52 |
| 4,991,164 | 2/1991 | Casiraghi et al. | 455/63 |
| 5,038,399 | 8/1991 | Bruckert | 455/67 |
| 5,060,292 | 10/1991 | Ayukawa et al. | 455/52 |

Primary Examiner—Reinhard J. Eisenzopf
Assistant Examiner—Edward Urban
Attorney, Agent, or Firm—Robert S. Babayi

[57] ABSTRACT

A method for adjusting the transmitter power of a subscriber unit includes the steps of determining noise characteristic of a receiver site, measuring strength of a signal received from the subscriber, determining a power adjust value based on the noise characteristic and the received signal strength. The transmit power of the subscriber unit is adjusted according to the power adjust value.

3 Claims, 4 Drawing Sheets

COMMUNICATION SYSTEM CAPABLE OF ADJUSTING TRANSMIT POWER OF A SUBSCRIBER UNIT

TECHNICAL FIELD

This invention relates generally to two-way radio frequency communication systems, and more specifically to battery operated variable power transceivers operating with such systems, and is particularly directed toward transmitter power control during transmissions by a battery operated variable power transceiver.

BACKGROUND ART

Numerous techniques exist to vary the power of a transmitter or transceiver operating within a communication system. For example, it is known that battery powered transceivers (subscriber units) may be instructed by a fixed station (i.e., a base unit or a repeater) to increase or decrease their transmitter power based on the strength of the received signal by the base. Accordingly, upon receipt of an appropriate command code from the fixed station, the battery powered transceiver adjusts its transmitter power (up or down) by a predetermined amount in accordance with the received signal strength measured at the fixed station. In this way, the operational life of the battery power subscriber units may be increased by permitting transmissions at reduced power when the battery powered subscriber units are near the fixed station.

In communication systems that measure the received signal strength for cutting back transmitter power of the subscribers units, the effects of receiver noise power are not taken into consideration. Generally, the assumption is made that the receiver noise floor is constant. However, the receiver noise floor may be effected by such external noise sources as adjacent channel transmitter side band noise and intermodulation distortion which may substantially increase the receiver noise floor. When the receiver noise floor is increased the received signal strength alone may not be sufficient to determine required power adjustment in the subscriber unit. For instance, under these circumstances the communication units must increase the transmitter power to accommodate for the increased noise level and to increase by the received signal to a level above the noise floor which provides uninterrupted communication. The received signal strength may go below the noise floor without the subscriber unit having any information to increase the received signal strength above the noise floor.

SUMMARY OF THE INVENTION

Accordingly, it is an object of the present invention to adjust transmitter power of a subscriber based on the noise characteristics of the received signal at the receiver.

Briefly, according to the invention, a received signal is received at a receiving site. The noise characteristic of the received signal at the receiving site is measured and a power adjust value corresponding there to is determined. The transmitter power of the subscriber unit is adjusted according to the power adjust value.

DETAILED DESCRIPTION OF THE PREFERRED EMBODIMENT

Figure 1:
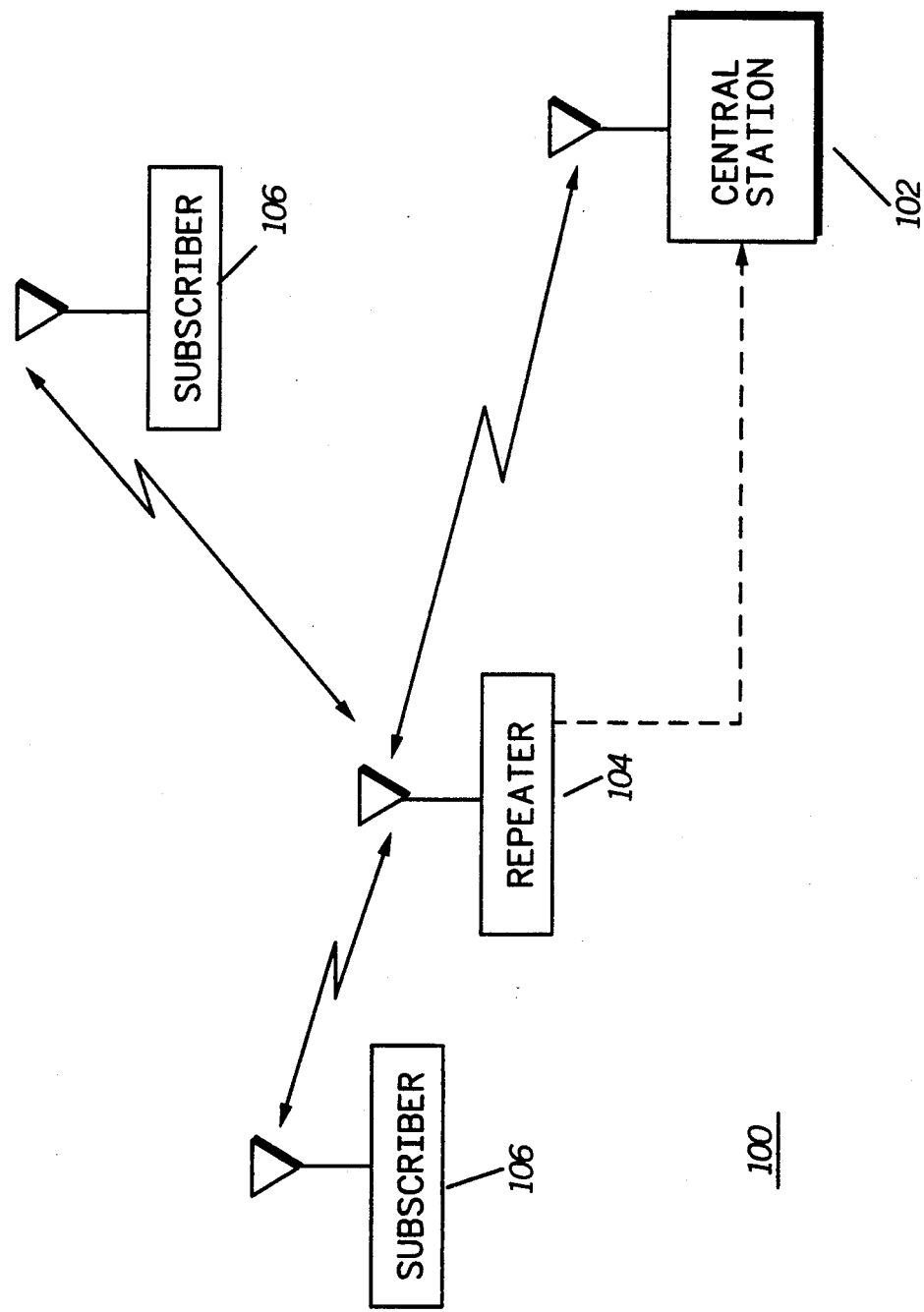
FIG. 1 is a block diagram of a communication system in accordance with the present invention.

Referring to FIG. 1, there is shown a block diagram of a communication system 100 in accordance with the present invention. The communication system 100 comprise a well known frequency modulated (FM) trunked communication system, such as those systems manufactured by Motorola Inc., which includes a central (or base) station 102 that may communicate via a repeater 104 or directly with a plurality of trunked subscriber units 106. As is well known, the trunked communication units 106 establish communication with each other by communicating inbound and outbound control messages with the central station 102. The subscriber units 106 may be portable units, mobile units, or control stations. As used herein, a portable subscriber unit is designed to be carried on or about the person; a mobile subscriber unit is designed to be installed in vehicles; and a control station is a permanent or semi-permanent installation in a building or other fixed location. The advantages of the present invention are chiefly exploitable by portable subscriber units, which typically are battery powered hand-held transceivers.

In FIG. 1, the central station 102 is shown communicating with the subscriber units 106 via a repeater 104. In this situation, it is known for the repeater 104 to measure the incoming signal strength and append it to the control message transmitted to the central station 102 via appropriate links, i.e. and RF link or a land line link (shown in dotted line). In this way, the central may send a command via the repeater 104 to the subscriber unit 106 to increase or decrease its transmitter power level. Alternately, this information could be stored locally and transmitted to the subscriber unit 106 with the next message directed towards the subscriber. When the central station 102 communicates directly with subscriber units, the central may measure the received signal strength itself and return a command code instructing the subscriber unit to increase or decrease its transmitter power in order to facilitate intelligible communication. By reducing the transmitter power to the minimum level needed to insure intelligible communication, the lifetime of the battery, and hence the subscriber unit, is maximized.

In many situations, the transmissions from portable subscriber units are directed towards other portable units through the central station 102. For example, public safety officers such as police and firemen typically communicate with each other via portable radios once they arrive at the scene of an incident (for example, a building fire or airline accident). Most of the communications are directed locally in an effort to coordinate the activities of the firemen and police officers through the central station 102. The present invention maintains the battery-savings advantages of power control in subscriber calls, such as between two individual subscriber units 106, or communication between a group of subscriber units by analyzing the noise characteristics of the received signal at a receiving site. In the described embodiment of the present invention, the receiving site is contemplated to be the repeater 104, however, it may be appreciated by one of ordinary skill in the art that noise analysis of the received signal may be performed at the central control station 102, or at the subscriber unit 106. As described herein a receiver site may be a part of the repeater 104, central control station 102, or the subscriber unit 106.

Figure 2:
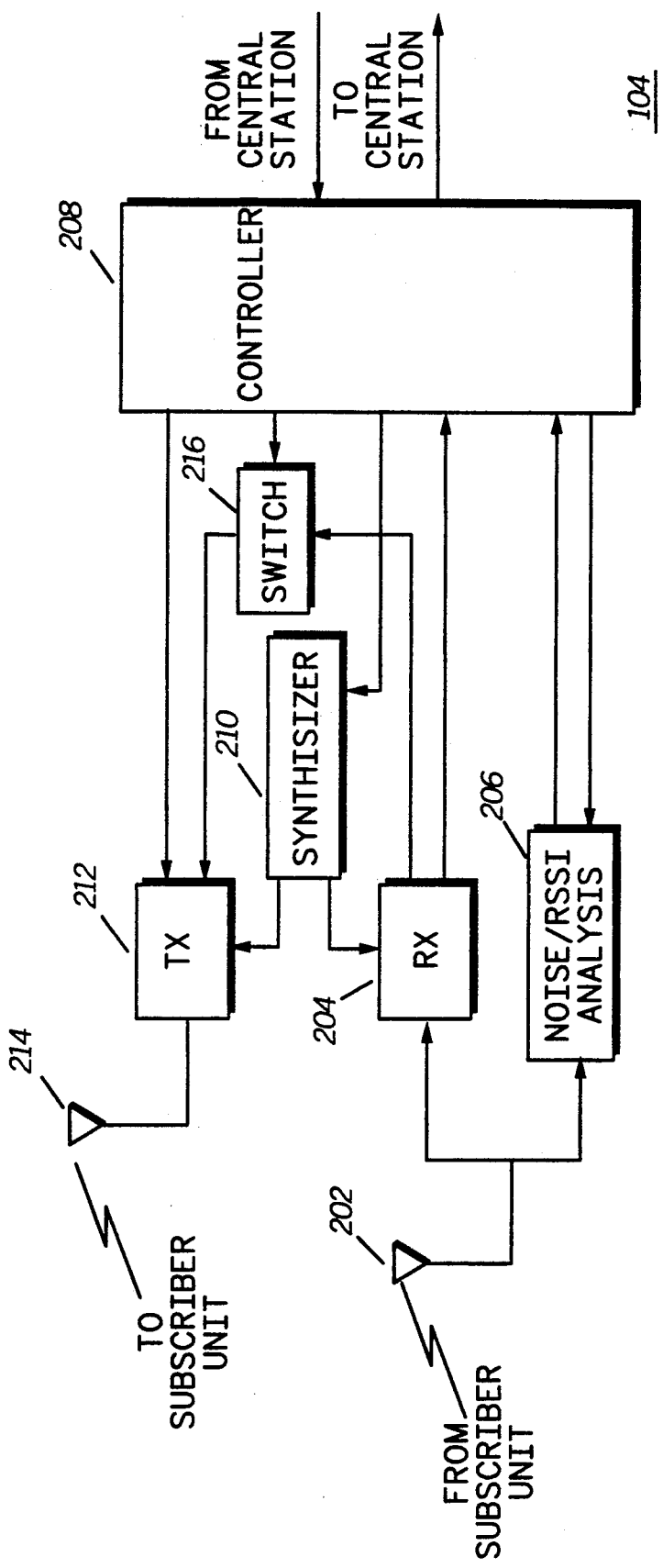
FIG. 2 is a block diagram of a repeater according to the present invention used in the communication system of FIG. 1.

Referring to FIG. 2, the block diagram of the repeater 104 according to the present invention is shown. The repeater 104 receives a received signal via an antenna 202 and routes it to a receiver 204 and a noise/received signal strength indicator (RSSI) analysis means 206. The receiver 204 comprise a well known trunked receiver which demodulates the received signal to recover voice or control messages. As described herein, the received signal includes any and all signals within the received frequency bandwidth which may or may not include the intended message signals at the carrier frequency. The control messages are applied to a controller 208 for processing and transmission to the central control station 102. The voice messages are applied to a transmitter 212 for transmission to the subscriber units 106 through a switch 216 which operates under the control of the controller 208. The controller 208 also applies the control messages received form the central station 102 to the transmitter for transmission to the subscriber units 106. The transmitter 212 comprise a well known trunked transmitter which transmits the control and the voice messages to the subscriber units 106 through an antenna 214. Under the control of the controller 208, a well known frequency synthesizer 210 generates appropriate local oscillator frequency signals for the transmitter 212 and the receiver 204 to transmit and receive on appropriate carrier frequencies. As will be described in detail, the noise/RSSI analysis means 206 includes the circuitry for determining the noise characteristics of the received signal, such as total noise power of the received signal in a predetermined band around the carrier of the received signal, and the circuitry for determining the intended message signal strength. In one embodiment of the present invention, the noise/RSSI analysis means 206 provides the power adjust value based on the total noise power of the received signal and the intended message signal strength. The power adjust value is applied to the controller 208 which after processing applies an appropriate control message to the transmitter 212 for transmission to the subscriber units 106. In another embodiment of the present invention, the total noise power is transmitted to the subscriber unit 106. The subscriber unit 106 determines the power adjust value based on the total noise power at the repeater 104 and the strength of the received signal from the repeater 104.

Figure 3:
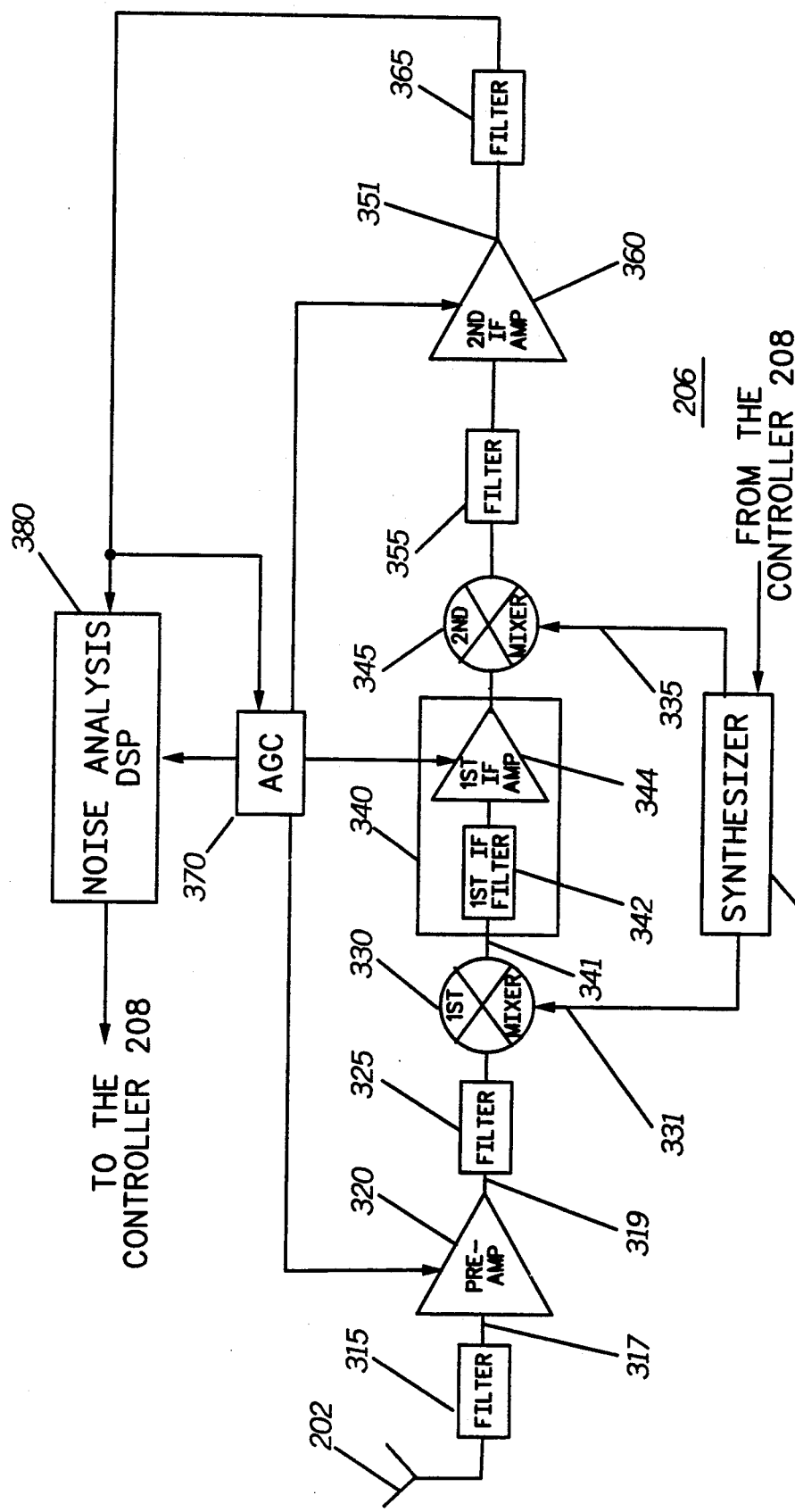
FIG. 3 is a preferred block diagram of a noise/RSSI analysis circuit used in the repeater of FIG. 2.

Referring to FIG. 3, a block diagram of the noise analysis means 206 is shown. The noise analysis means 206 basically comprises a double conversion FM receiver having circuitry for performing noise power spectral analysis within a predetermined band. In the preferred embodiment of the invention, a portion of the receiver 206 (i.e. preselector, 1st IF and 2nd IF circuitry without the limiter/detector and audio circuitry) is duplicated for performing the spectral noise analysis at the repeater 104. Although a double conversion FM receiver is well known in the art, the stages of its operation is briefly described. Operationally, the received signal at the antenna 202 is coupled to a filter 315. The filter 315 provides the initial receiver selectivity, and produces a RF IN signal 317 proportional to the strength of the received signal. The RF IN signal 317 is applied to a preamplifier stage 320 having a variable gain. An RF OUT signal 319 as provided by the preamplifier stage 320 is applied to a filter 325 to provide additional receiver selectivity. The output of the 325 and a 1st LO signal 331 are applied to a 1st mixer 330, and provides a 1st IF signal 341. A synthesizer 350 under the control of the controller 208 of FIG. 2 provides the 1st LO signal 331. As well known, the synthesizer 350 may be programmed to generate a proper frequency for providing the 1st IF signals 341. The output of the 1st mixer 330 is coupled to a first IF stage 340, which includes a 1st IF filter 342 and a 1st IF amplifier 344. The 1st IF filter 342 of the preferred embodiment comprises a band pass filters which is centered at the 1st intermediate frequency, and provides selectivity for the first IF stage 340. The output of the 1st IF filter 342 is amplified by the 1st IF amplifier 344, and is coupled to a 2nd mixer 345. A 2nd LO signal 335 as generated by the synthesizer 350 is applied to the 2nd mixer 345 the output of which is filtered by a filter 355 and amplified by a 2nd IF amplifier 360 to provide a 2nd IF signal 351. In the preferred embodiment of the invention, the noise characteristic of of the received signal is analyzed at the output of the 2nd IF stage prior to limiter/detector circuitry because this point includes all of the noise components outside of the desired receiver frequency bandwidth. However, it may be appreciated by one of ordinary skill in the art that the received signal noise characteristic may be determined at any point along the receiver. The 2nd IF signal is filtered by a filter 365 and is applied to an automatic gain control (AGC) circuit 370 and a spectral analysis digital signal processor (DSP) 380. It is well known that by controlling the gain of amplifiers 320, 344, and 360 via the AGC circuit 370 an appropriate dynamic range may be maintained which facilitates spectral analysis of the 2nd IF signal 351. The spectral analysis of the received signal noise is well known and may be performed utilizing a number of noise analysis techniques. In the preferred embodiment of the invention, the synthesizer 350 is programmed to sweep a limited frequency spectrum (e.g. 25 Khz) around the center frequency of the 2nd IF signal at predetermined frequency steps (1 Khz).

The noise analysis DSP 380 determines total noise power at the repeater 104 (or the receiver site) at each frequency step by well known integration techniques. It is well known that the total noise power is the combination of the receiver added noise and the received signal noise. The receiver added noise is the noise created by the receiver itself and the received signal noise is noise created by sources external to the receiver. The received signal noise may include interference, adjacent transmitter carrier frequency noise, amd distortion. The intended message signal strength is also determined by the noise analysis DSP 380 using any well known technique. The noise analysis DSP 380 may provide the total noise power and the intended message signal strength to the controller 208. Alternatively, the DSP 380 may provide the power adjust value to the controller 208 of FIG. 2. The noise analysis DSP 380 may determine the power adjust value in a number of ways. The power adjust value may depend on the signal to noise ratio of the received signal. The noise analysis DSP 380 may also be programmed to provide a power adjust value proportionate to the signal to noise ratio once the signal to noise ratio has exceeded a predetermined threshold. The predetermined threshold may be dependent upon the receiver added noise. Alternatively, the power adjust value may be proportionate to the difference between the total noise power (i.e., the noise floor) and the strength of the intended message signal. In this manner, the power adjust value depends on the instantaneous noise characteristic of the received signal and may vary, in real time, as the noise characteristic of the received signal is changed.

Figure 4:
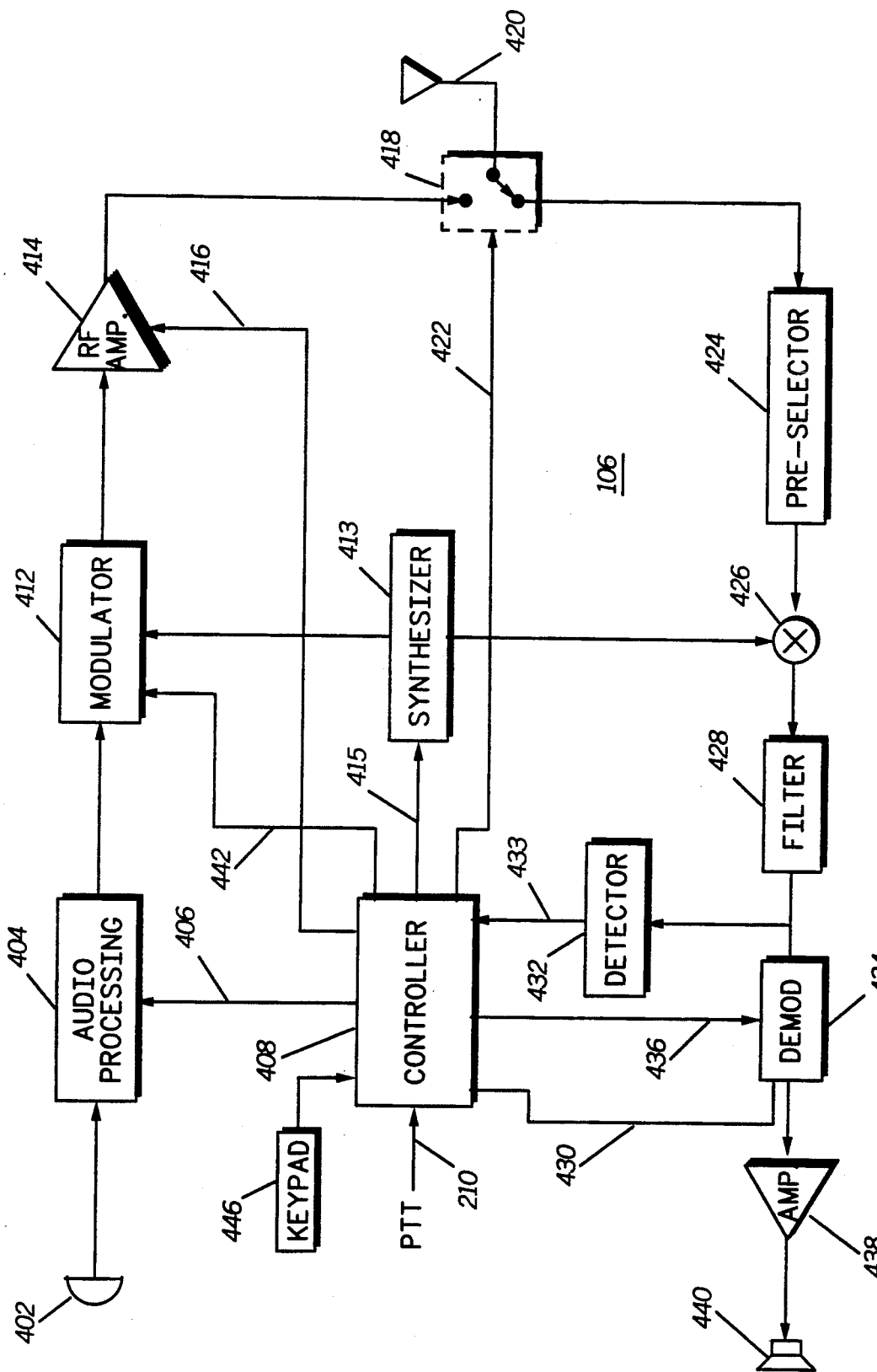
FIG 4 is a block diagram of a subscriber unit of FIG. 1.

Referring to FIG. 4, a block diagram of a subscriber unit 106 in accordance with present invention is shown. Audio energy impressed upon a microphone 402 is received and processed by an audio processing portion 404, which is activated (406) by the controller 408. The controller 408 comprises the heart of the subscriber unit 106 and will activate the audio processing portion 404 in response to a push-to-talk (PTT) switch input 410. The processed audio is forwarded to a modulator 412, which accepts as a second input the output of a synthesizer 413 (optionally, the synthesizer 413 could be directly modulated as is known in the art). The synthesizer is programmed (415) by the controller 408 to the desired transmission frequency. The modulated signal is applied to a radio frequency (RF) power amplifier 414, which has a power level control line 416 to adjust the transmitter power in accordance with the commands of the controller 408 (typically, the RF power amplifier 414 may include an automatic level control circuit). The amplified signal is routed to an antenna 420 via an antenna switch 418, which is controlled (422) by the controller 408.

When receiving, the antenna 420 is coupled to a preselector 424 via the antenna switch 418. The preselector 424 comprises a filter, which band-limits the frequency spectrum to a band of interest for the receiver. The filtered output of the preselector 424 is routed to a mixer 426, which accepts as a second input the signal from the synthesizer 413 to down convert the received signal. The output of the mixer 426 is coupled to a filter 428, which further band-limits the signal to a suitable intermediate frequency (IF) as is known in the art. After filtering, the received information is routed to a demodulator 434. When activated (436) by the controller 408, the demodulator supplies data (such as signal strength information) to the controller 408 (via the data line 430), while audio information is routed to an audio amplifier 438 and provided to a speaker 440 to be broadcast to the operator.

Additionally, the subscriber unit 106 includes the detector 432, which measures the received signal strength at the output of the filter 428. The signal strength information is routed to the controller 408 via the signal strength line 433. In this way, the controller 408 if desired, can return the signal strength information to another subscriber unit by routing (422) the signal strength information to the modulator 412 for transmission.

Any power adjust information received (430) by the controller 408 is processed to determine whether to increase or decrease the power of the subscriber by adjusting (416) the RF power amplifier 414. In another aspect of the present invention, the automatic operation of the power control system can be defeated via a key pad 446, which will program the controller 408 to disregard the power adjust information received on the data line 430. Additionally, the central 102 may transmit a command code disabling the automatic power reduction provided by the present invention. In this way, an operator supervising the central station would be able to receive all subscriber communications as they would be transmitted at full power.

Accordingly, the transmitter power of the communication units 106 is adjusted based on the instantaneous noise characteristic of the received signal at the receiving site which results in a more efficient and reliable communication of messages within the system.

What is claimed is:

1. A method for adjusting the transmitter power of a subscriber unit, comprising the steps of:
   (a) receiving a received signal at a receiver site, said received signal being transmitted by the subscriber unit;
   (b) determining noise floor of the receiver site;
   (c) determining the strength of the received signal;
   (d) determining a power adjust value based on the difference between the noise floor of the receiver site and the strength of the received signal;
   (e) transmitting the power adjust value to the subscriber unit; and
   (f) adjusting the transmitter power of the subscriber unit according to the power adjust value.

2. The method of claim 1, wherein said step (b) and (d) includes the steps of:
   (b) (1) determining total noise power by adding noise power at the receiver site to noise power of the received signal
   (b) (2) determining the power adjust value based on the total noise power and the strength of the received signal.

3. A communication system capable of adjusting transmitter power of a subscriber unit comprising:
   at least one subscriber unit;
   means for receiving a received signal at a receiver site: said received signal being transmitted by the subscriber unit:
   means for determining the strength of the received signal;
   means for determining noise floor of the receiver site;
   means for determining a power adjust value based on the difference between the noise floor of the receiver site and the strength of the received signal; and
   means for transmitting the power adjust value to the subscriber unit.

* * * * *